US008583846B2

(12) United States Patent
Chiba

(10) Patent No.: US 8,583,846 B2
(45) Date of Patent: Nov. 12, 2013

(54) EXTENDER

(75) Inventor: Hiroaki Chiba, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 263 days.

(21) Appl. No.: 13/019,033

(22) Filed: Feb. 1, 2011

(65) Prior Publication Data

US 2012/0002108 A1 Jan. 5, 2012

(30) Foreign Application Priority Data

Jun. 30, 2010 (JP) ................................ 2010-149101

(51) Int. Cl.
*G06F 13/00* (2006.01)

(52) U.S. Cl.
USPC .......................................... 710/303; 710/305

(58) Field of Classification Search
USPC ............... 710/300–306, 106, 71; 345/89–100
See application file for complete search history.

(56) References Cited

U.S. PATENT DOCUMENTS

| | | | | |
|---|---|---|---|---|
| 7,774,516 | B2 * | 8/2010 | Hsieh et al. | 710/36 |
| 7,907,208 | B2 * | 3/2011 | Chiba | 348/441 |
| 2003/0067456 | A1 | 4/2003 | Low et al. | |
| 2006/0023069 | A1 | 2/2006 | Saito | |
| 2009/0007213 | A1 | 1/2009 | Takezaki | |
| 2010/0023660 | A1 * | 1/2010 | Liu | 710/71 |
| 2010/0165197 | A1 | 7/2010 | Hattori | |

FOREIGN PATENT DOCUMENTS

| | | | |
|---|---|---|---|
| JP | 2-285889 | | 11/1990 |
| JP | 08-278479 | * | 10/1996 |
| JP | 10-187111 | | 7/1998 |
| JP | 2003-186667 | * | 7/2003 |
| JP | 2004-192132 | | 7/2004 |
| JP | 2004-282380 | | 10/2004 |
| JP | 2004-334582 | | 11/2004 |
| JP | 2005-08-0030 | | 3/2005 |
| JP | 2005-065871 | | 3/2005 |
| JP | 2005-354622 | | 12/2005 |
| JP | 2006-092043 | | 4/2006 |
| JP | 2007-086471 | | 4/2007 |
| JP | 2007-251779 | | 9/2007 |

(Continued)

OTHER PUBLICATIONS

Japanese Patent Application No. 2010-149101, Notification of Reasons for Refusal, drafted May 12, 2011, (with English Translation).

(Continued)

*Primary Examiner* — Tim T Vo
*Assistant Examiner* — Kim Huynh
(74) *Attorney, Agent, or Firm* — Blakely, Sokoloff, Taylor & Zafman LLP

(57) ABSTRACT

In one embodiment, there is provided an extender for extending functions of an electronic apparatus. The extender includes: a connection terminal electrically connected to the electronic apparatus; input signal lines connected to the connection terminal to transmit a video signal that is supplied from the electronic apparatus via the connection terminal; a first video output terminal which complies with a first standard; a second video output terminal which complies with a second standard; and a signal converter configured to convert the video signal into a first video signal that complies with the first standard to output the first video signal to the first video output terminal and configured to convert the video signal into a second video signal that complies with the second standard to output the second video signal to the second video output terminal.

10 Claims, 12 Drawing Sheets

(56) References Cited

FOREIGN PATENT DOCUMENTS

| | | | |
|---|---|---|---|
| JP | 2009-010629 | | 1/2009 |
| JP | 2009-111864 | | 5/2009 |
| JP | 2010-130660 | * | 6/2010 |
| JP | 2011-004215 | | 1/2011 |
| WO | WO 2007-114347 | | 10/2007 |

OTHER PUBLICATIONS

Japanese Patent Application No. 2010-149101, Notification of Reasons for Refusal, drafted Aug. 18, 2011, (with English Translation).

Japanese Patent Application No. 2012-021318, Notification of Reasons for Refusal, mailed Feb. 19, 2013, (with English Translation).

* cited by examiner

*FIG.3A*

| PRIORITY ORDER: ANALOG RGB > HDMI > DP | | | | |
|---|---|---|---|---|
| 1ST MUX CONTROL SIGNAL | 2ND MUX CONTROL SIGNAL | 1ST MUX OUTPUT DIRECTION | 2ND MUX OUTPUT DIRECTION | VIDEO SIGNAL OUTPUT TERMINAL |
| HPL_RGB | HPL_HDMI | | | |
| 0 | 0 | 0 | 0 | DP SOCKET |
| 0 | 1 | 0 | 1 | HDMI SOCKET |
| 1 | - | 1 | - | RGB SOCKET |

*FIG.3B*

| PRIORITY ORDER: ANALOG RGB > HDMI > DP | | | | |
|---|---|---|---|---|
| 1ST MUX CONTROL SIGNAL | 2ND MUX CONTROL SIGNAL | 1ST MUX OUTPUT DIRECTION | 2ND MUX OUTPUT DIRECTION | VIDEO SIGNAL OUTPUT TERMINAL |
| HPL_RGB | HPL_DP | | | |
| 0 | 0 | 0 | 0 | HDMI SOCKET |
| 0 | 1 | 0 | 1 | DP SOCKET |
| 1 | - | 1 | - | RGB SOCKET |

FIG.5A

| PRIORITY ORDER: HDMI > ANALOG RGB > DP | | | | |
|---|---|---|---|---|
| 1ST MUX CONTROL SIGNAL | 2ND MUX CONTROL SIGNAL | 1ST MUX OUTPUT DIRECTION | 2ND MUX OUTPUT DIRECTION | VIDEO SIGNAL OUTPUT TERMINAL |
| HPL_HDMI | HPL_RGB | | | |
| 0 | 0 | 0 | 0 | DP SOCKET |
| 0 | 1 | 0 | 1 | RGB SOCKET |
| 1 | - | 1 | - | HDMI SOCKET |

FIG.5B

| PRIORITY ORDER: HDMI > DP > ANALOG RGB | | | | |
|---|---|---|---|---|
| 1ST MUX CONTROL SIGNAL | 2ND MUX CONTROL SIGNAL | 1ST MUX OUTPUT DIRECTION | 2ND MUX OUTPUT DIRECTION | VIDEO SIGNAL OUTPUT TERMINAL |
| HPL_HDMI | HPL_DP | | | |
| 0 | 0 | 0 | 0 | RGB SOCKET |
| 0 | 1 | 0 | 1 | DP SOCKET |
| 1 | - | 1 | - | HDMI SOCKET |

*FIG. 10*

| 1ST MUX CONTROL SIGNAL | 2ND MUX CONTROL SIGNAL | 1ST MUX OUTPUT DIRECTION | 2ND MUX OUTPUT DIRECTION | VIDEO SIGNAL OUTPUT TERMINAL |
|---|---|---|---|---|
| 1ST SWITCH | 2ND SWITCH | | | |
| 0 | 0 | 0 | 0 | DP SOCKET |
| 0 | 1 | 0 | 1 | HDMI SOCKET |
| 1 | – | 1 | – | RGB SOCKET |

FIG. 12

| 1ST MUX CONTROL SIGNAL | 2ND MUX CONTROL SIGNAL | 1ST MUX OUTPUT DIRECTION | 2ND MUX OUTPUT DIRECTION | VIDEO SIGNAL OUTPUT TERMINAL |
|---|---|---|---|---|
| 1ST GPIO OUTPUT | 2ND GPIO OUTPUT | | | |
| 0 | 0 | 0 | 0 | DP SOCKET |
| 0 | 1 | 0 | 1 | HDMI SOCKET |
| 1 | – | 1 | – | RGB SOCKET |

EXTENDER

This application claims priority from Japanese Patent Application No. 2010-149101, filed on Jun. 30, 2010, the entire contents of which are hereby incorporated by reference.

BACKGROUND

1. Field

Embodiments described herein generally relates to an extender for extending the functions of an electronic apparatus.

2. Description of the Related Art

Among portable electronic apparatus such as notebook personal computers and PDAs (personal digital assistants) are ones which can use an apparatus having functions to be added (extender) to extend functions usable by a user while maintaining their high portability. Each of an electronic apparatus and an extender is provided with a connection terminal for their electrical connection.

In general, an extender and an electronic apparatus are electrically connected to each other by a prescribed number of signal lines via their connection terminals. Signal exchange between the extender and the electronic apparatus is performed via the prescribed number of signal lines.

One of signals that are exchanged by an extender and an electronic apparatus is a video signal. Various techniques using their own signal transmission methods have been proposed to decrease the number of signal lines relating to a video signal. These techniques can decrease the number of signal lines relating to a video signal and thereby miniaturize the connection terminals for connection between an extender and an electronic apparatus.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention:

FIGS. 3A and 3B show example operations of a signal converter in a case that a highest priority is given to connection to a RGB socket; FIG. 3A shows an example operation of the signal converter in a case that a higher priority is given to connection, made by the extender shown in FIG. 2, to an HDMI socket than to connection to a DP socket and FIG. 3B shows an example operation of the signal converter in a case that a higher priority is given to connection to the DP socket than to connection to the HDMI socket;

FIGS. 5A and 5B show example operations of a signal converter in a case that a highest priority is given to connection to the HDMI socket; FIG. 5A shows an example operation of the signal converter in a case that a higher priority is given to connection, made by the extender shown in FIG. 4, to the RGB socket than to connection to the DP socket and FIG. 5B shows an example operation of the signal converter in a case that a higher priority is given to connection to the DP socket than to connection to the RGB socket;

FIG. 10 shows an example operation of a signal converter in a case that a highest priority is given to connection to an RGB socket made by the extender of FIG. 9;

FIG. 12 shows an example operation of a signal converter in a case that a highest priority is given to connection to an RGB socket made by the extender of FIG. 11.

DETAILED DESCRIPTION

According to exemplary embodiments of the present invention, there is provided an extender for extending functions of an electronic apparatus. The extender includes: a connection terminal electrically connected to the electronic apparatus; input signal lines connected to the connection terminal so as to transmit a video signal that is supplied from the electronic apparatus via the connection terminal, wherein the number the input signal lines complies with a certain video signal standard; a first video output terminal which complies with a first standard; a second video output terminal which complies with a second standard; and a signal converter configured to convert the video signal that is supplied from the electronic apparatus into a first video signal that complies with the first standard so as to output the first video signal to the first video output terminal and configured to convert the video signal into a second video signal that complies with the second standard so as to output the second video signal to the second video output terminal.

Extender according to embodiments of the present invention will be hereinafter described with reference to the accompanying drawings.

Each of the extender according to the embodiments of the invention is an extender for extending the functions of an electronic apparatus. The extender has video output terminals that comply with plural respective standards and decreases the number of signal lines relating to a video signal that are electrically connected to an electronic apparatus via connection terminals. The following description will be directed to a case that the electronic apparatus connected to the extender according to each embodiment of the invention is a notebook personal computer (hereinafter referred to as a notebook PC). However, in the invention, the electronic apparatus is not limited to a notebook PC and may be a PDA (personal digital assistant), a portable game machine, a portable music player, a portable moving image player, or the like.

(1) First Embodiment (1-1) Configuration

Figure 1:
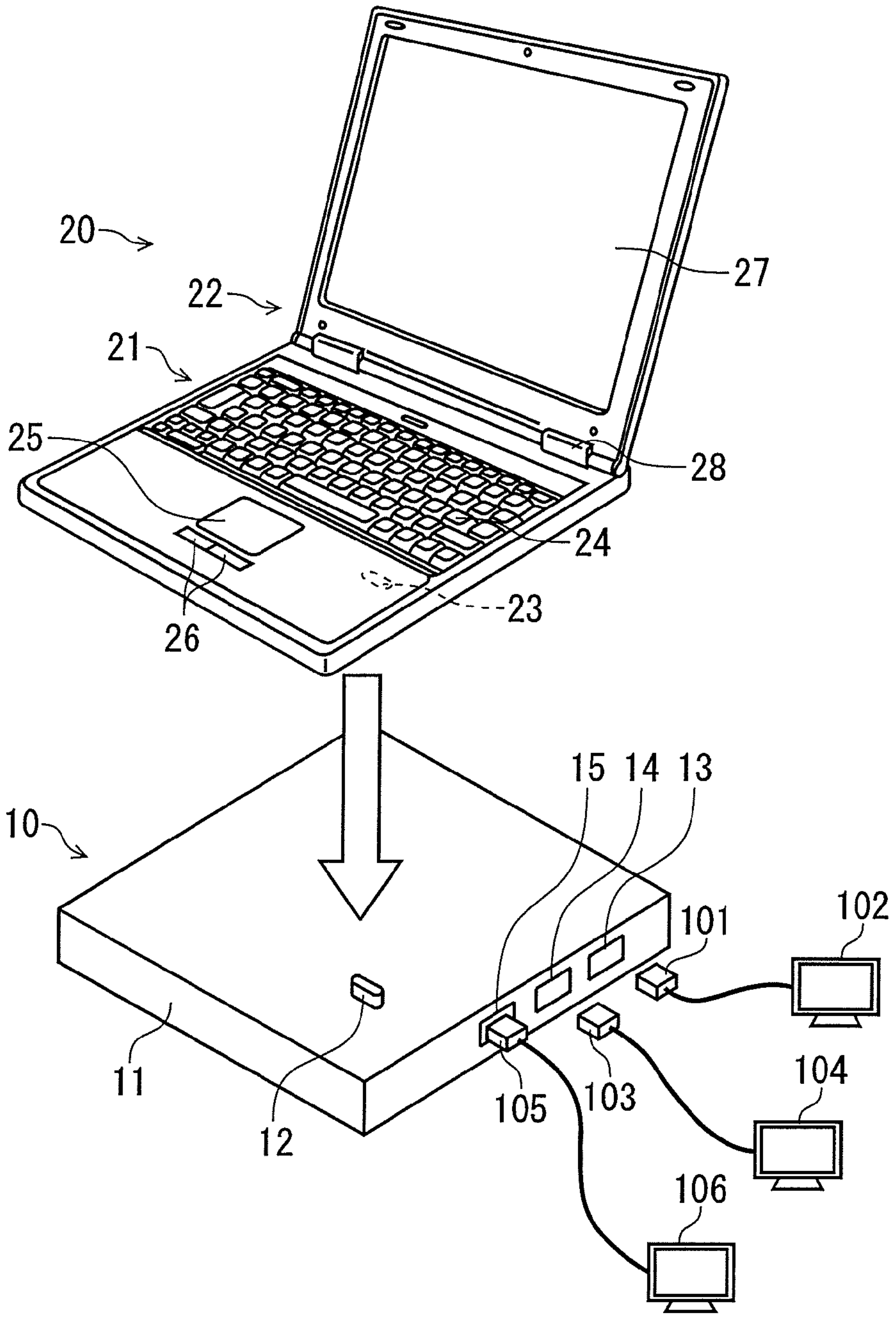
FIG. 1 is a perspective view of an extender according to a first embodiment of the present invention and a notebook PC as an electronic apparatus to be connected to the extender.

FIG. 1 is a perspective view of an extender according to a first embodiment of the invention and a notebook PC 20 as an electronic apparatus to be connected to the extender 10.

The extender 10 is an apparatus which is provided with functions to be added to extend functions usable by a user while maintaining high portability of the notebook PC 20. The extender 10 has a base unit 11 containing various circuits and an extender-side connection terminal 12 for electrical connection to the notebook PC 20. In the embodiment, as shown in FIG. 1, the extender 10 also has a video output terminal (RGB socket) 13 that complies with the analog RGB standard which was standardized by the VESA (Video Electronics Standards Association), an HDMI socket 14 that complies with the HDMI (high-definition multimedia interface) standard, and a video output terminal (DP socket) that complies with the DisplayPort standard (DP standard).

An RGB plug 101 is to be connected to the RGB socket 13. The RGB socket 13 outputs a video signal that complies with the analog RGB standard to an external display device 102 (monitor display) that is connected to the RGB plug 101 and is compatible with the analog RGB standard, via the RGB plug 101.

An HDMI plug 103 is to be connected to the HDMI socket 14. The HDMI socket 14 outputs a video signal that complies with the HDMI standard to an external display device 104 that is connected to the HDMI plug 103 and is compatible with the HDMI standard, via the HDMI plug 103. A DP plug 105 is to be connected to the DP socket 15. The DP socket 15 outputs a video signal that complies with the DP standard to an external display device 106 that is connected to the DP plug 105 and is compatible with the DP standard, via the DP plug 105.

The notebook PC 20 is equipped with a computer main body 21 and a display unit 22 which is a display device. The computer main body 21 has a thin, box-shaped cabinet and the bottom surface of the cabinet is provided with a PC-side connection terminal 23 that can be electrically connected to the extender-side connection terminal 12 of the extender 10. For example, one of the extender-side connection terminal 12 and the PC-side connection terminal 23 projects from the cabinet of the extender 10 or the notebook PC 20 by a prescribed length and the other is recessed so as to be fitted with the one connection terminal 12 or 23.

A rear portion of the top surface of the cabinet of the computer main body 21 is provided with a keyboard 24 which is a manipulation unit. A front portion of the cabinet is provided with a palm rest. A central portion of the palm rest is provided with a touch pad 25 and touch pad buttons 26 which constitute another manipulation unit. On the other hand, the display unit 22 has a display panel 27 and is connected to the computer main body 21 by connection members (hinges) 28 which support the display unit 22 so that it can be opened and closed.

The manipulation units (keyboard 24 and touch pad 25/touch pad buttons 26) supplies a main controller 32 (see FIG. 2) of the notebook PC 20 with an input manipulation signal corresponding to a user manipulation. The display panel 27, which is a general display output device such as a liquid crystal display, an OLED (organic light-emitting diode) display, or an LED (light-emitting diode) display, displays various kinds of information under the control of the main controller 32.

Figure 2:
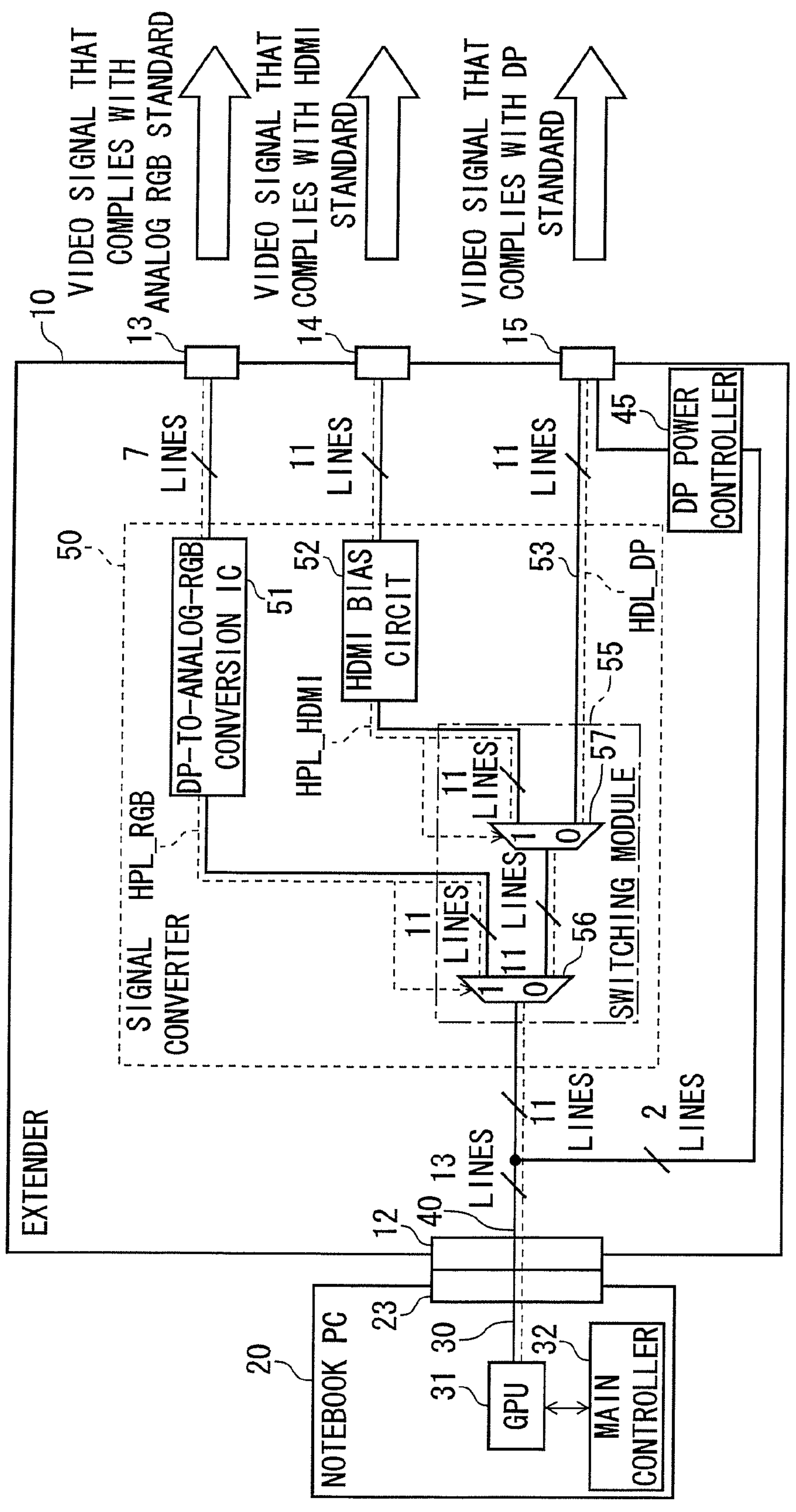
FIG. 2 is a block diagram outlining example internal configurations of the extender and the notebook PC shown in FIG. 1.

FIG. 2 is a block diagram outlining example internal configurations of the extender 10 and the notebook PC 20 shown in FIG. 1.

As shown in FIG. 2, the notebook PC 20 is further equipped with signal lines 30 the number of which is at least equal to a number that complies with a prescribed video signal standard, a GPU (graphics processing unit) 31 having an image processing function, and the main controller 32. Controlled by the main controller 32, the GPU 31 outputs a video signal that complies with the prescribed video signal standard to the extender 10 via the signal lines 30 and the PC-side connection terminal 23 to which the signal lines 30 are connected. The main controller 32 is composed of a CPU, storage media such as a RAM and a ROM, etc., and controls operations of the notebook PC 20 according to programs stored in those storage media.

On the other hand, the extender 10 is further equipped with signal lines the number of which complies with the prescribed video signal standard and which are connected to the extender-side connection terminal 12, a DP power controller 45, and a signal converter 50.

The signal lines 40, which are electrically connected to the signal lines 30 via the PC-side connection terminal 23, supply the signal converter 50 with a video signal that is output from the GPU 31.

The signal converter 50 receives a video signal that complies with the prescribed video signal standard from the GPU 31 via the signal lines 30, the PC-side connection terminal 23, the extender-side connection terminal 12, and the signal lines 40. The signal converter 50 converts the received video signal which complies with the prescribed video signal standard into a video signal that complies with the video signal standard corresponding to one of the video output terminals 13-15 of the extender 10 and outputs the latter video signal to that video output terminal.

For example, assume that the extender 10 has video output terminals that comply with first and second standards and the GPU 31 outputs a video signal that complies with a third standard. In this case, when receiving a video signal that complies with the third standard, the signal converter 50 converts the received video signal into a video signal that complies with the first standard and outputs it to the video output terminal that complies with the first standard. Or the signal converter 50 converts the received video signal into a video signal that complies with the second standard and outputs it to the video output terminal that complies with the second standard.

If the standard corresponding to a destination video output terminal is the same as the standard with which a video signal that is output from the GPU 31 complies, the signal converter 50 outputs a video signal that complies with that standard. This means that the signal converter 50 outputs the received video signal to the target video output terminal as it is without converting it.

The following description will be directed to a case that the extender 10 is equipped with the RGB socket 13, the HDMI socket 14, and the DP socket 15 and the GPU 31 outputs a video signal that complies with the physical layer standard and the logical layer standard of the DP standard (i.e., a video signal that complies with the DP standard) or a video signal that complies with the logical layer standard of the HDMI standard, and the video signal is transmitted by signal lines 30 and 40 that comply with the DP standard.

In this case, the number of lines of each of the set of signal lines 30 and the set of signal lines 40 is at least equal to the number that complies with the DP standard. The number of lines that complies with the DP standard is eleven, that is, ten for transmission of differential signals (two is of sideband signal lines corresponding to signal lines for transmission of a DDC (VESA display data channel) signal that complies with the HDMI standard or the like) plus one for transmission of a hot plug signal.

The embodiment is directed to a case that each of the set of signal lines 30 and the set of signal lines 40 further has two signal lines for power control via which the GPU 31 supplies an instruction to the DP power controller 45. Therefore, each of the set of signal lines 30 and the set of signal lines 40 has 13 lines in total.

The number of lines that complies with the analog RGB standard is seven, that is, three for transmission of R, G, and B signals, two for transmission of a sync signal, and two for transmission of a DDC signal. The number of lines that complies with the HDMI standard is eleven, that is, eight for transmission of differential signals, two for transmission of a DDC signal, and one for transmission of a hot plug signal.

The DP power controller 45 is controlled by the GPU 31 via the two signal lines for power control and controls the supply of power to the DP socket 15.

The signal converter 50 is equipped with a DP-to-analog-RGB conversion IC (integrated circuit) (hereinafter referred to as a RGB converter) 51, an HDMI bias circuit (hereinafter referred to as a HDMI converter) 52, and a DP converter 53. Signal lines that comply with the same video standard as the signal lines 30 and 50 do are connected to the video signal input side (GPU 31 side) of each of the converters 51-53. Sets of signal lines that comply with the video signal standards corresponding to the sockets 13-15 are connected to the video signal output sides (the sides of the sockets 13-15) of the converters 51-53, respectively.

The RGB converter (DP-to-analog-RGB conversion IC) 51 converts a video signal that is output from the GPU 31 and complies with the DP standard into a video signal that complies with the analog RGB standard, and outputs the latter video signal to the RGB socket 13.

Furthermore, the RGB converter 51 monitors the output potential of the RGB socket 13. The RGB socket 13 outputs a high-level potential when the RGB plug 101 is connected to it, and outputs a low-level potential when the RGB plug 101 is not connected to it. Utilizing the output potential of the RGB socket 13 as a connection recognition signal, the RGB converter 51 generates a signal (HPL_RGB signal) that is equivalent to a hot plug signal (HPL_HDMI signal) to be output from the HDMI socket and a hot plug signal (HPL_DP signal) to be output from the DP socket 15, and outputs the generated signal to the GPU-side signal lines.

In other words, the RGB socket 13 is configured so as to output a connection recognition signal to the signal converter 50 when the RGB plug 101 is connected to it. Each of the HDMI socket 14 and the DP socket 15 outputs a hot plug signal (connection recognition signal) to the signal converter 50 when the HDMI plug 103 or the DP plug 105 is connected to it. In FIG. 2, signal lines for transmission of a connection recognition signal are drawn by broken lines.

The HDMI converter (HDMI bias circuit) 52 converts a video signal that is output from the GPU 31 and complies with the logical layer standard of the HDMI standard into a video signal that complies with the physical layer standard of the HDMI standard by adjusting a bias voltage (physical layer information) of the former video signal, and outputs the latter video signal to the HDMI socket 14. As a result, the video signal that is output from the HDMI converter 52 is a video signal that complies with the physical layer standard and the logical layer standard of the HDMI standard.

The HDMI converter 52 receives a hot plug signal (HPL_HDMI signal) that is output from the HDMI socket 14, and outputs it to the GPU-side signal lines as it is.

The DP converter 53 is a section for outputting a video signal that is output from the GPU 31 and complies with the DP standard to the DP socket 15 as it is. The DP converter 53 is therefore formed by simple wiring lines (signal lines) that comply with the DP standard.

The DP converter 53 receives a hot plug signal (HPL_DP signal) that is output from the DP socket 15, and outputs it to the GPU-side signal lines as it is.

A connection recognition signal that is supplied to the signal converter 50 is transferred to the GPU 31 via the signal lines 40, the extender-side connection terminal 12, the PC-side connection terminal 23, and the signal lines 30.

The embodiment is directed to a case that the signal converter 50 outputs a video signal to a selected one of the sockets 13-15. In this case, the signal converter 50 has a switching module 55.

The switching module 55 is equipped with a first multiplexer (MUX) 56 and a second multiplexer 57.

The first multiplexer 56 supplies a video signal that is received from the GPU 31 to one of the RGB converter 51 or the second multiplexer 57. The first multiplexer 56 receives, as a switching control signal, an HPL_RGB signal that is generated by the RGB converter 51 by converting a connection recognition signal that is output from the RGB socket 13.

For example, the HPL_RGB signal is input to the first multiplexer 56 as a switching control signal via a new single signal line produced by one-to-two branching of one signal line for transmission of a hot plug signal that is included in the signal lines that connect one output terminal of the first multiplexer 56 to the RGB converter 51.

As shown in FIG. 2, the first multiplexer 56 connects the signal lines 40 to the RGB converter 51 if the HPL_RGB signal is at a high level (indicated by a number "1" shown in the first multiplexer 56 in FIG. 2), and connects the signal lines 40 to the second multiplexer 57 if the HPL_RGB signal is at a low level (indicated by a number "0" shown in the first multiplexer 56 in FIG. 2). In the following description, a connection recognition signal at the high level is represented by "1" and a connection recognition signal at the low level is represented by "0."

The second multiplexer 57 supplies the video signal received from the first multiplexer 56 to one of the HDMI converter 52 and the DP converter 53. The second multiplexer 57 receives, as a switching control signal, via the HDMI converter 52, a connection recognition signal (HPL_HDMI signal) that is output from the HDMI socket 14.

As in the case of the above-described HPL_RGB signal, an HPL_HDMI signal is input to the second multiplexer 57 as a switching control signal via, for example, a new single signal line produced by one-to-two branching of one signal line for transmission of a hot plug signal that is included in the signal lines that connect one output terminal of the second multiplexer 57 to the HDMI converter 52.

As shown in FIG. 2, the second multiplexer 57 connects the first multiplexer 56 to the HDMI converter 52 if the HPL_HDMI signal is at the high level "1," and connects the first multiplexer 56 to the DP converter 53 if the HPL_HDMI signal is at the low level "0."

(1-2) Operations in a Case that Highest Priority is Given to Connection to RGB Socket 13

FIGS. 3A and 3B show example operations of the signal converter 50 in a case that a highest priority is given to connection to the RGB socket 13. More specifically, FIG. 3A shows an example operation of the signal converter 50 in a case that a higher priority is given to connection, made by the extender 10 shown in FIG. 2, to the HDMI socket 14 than to connection to the DP socket 15. FIG. 3B shows an example operation of the signal converter 50 in a case that a higher priority is given to connection to the DP socket 15 than to connection to the HDMI socket 14.

(1-2-1) Case that Higher Priority is Given to Connection to HDMI Socket 14 than to Connection to DP Socket 15

As shown in FIGS. 2 and 3A, in the configuration of FIG. 2, a highest priority is given to connection to the RGB socket 13 and a higher priority is given to connection to the HDMI socket 14 than to connection to the DP socket 15. More specifically, if the RGB plug 101 is connected to the RGB socket 13 and hence an HPL_RGB signal at the high level "1" is input to the first multiplexer 56, a video signal received from the GPU 31 is supplied to the RGB converter 51 irrespective of connection statuses of the other sockets 14 and 15 and converted into a video signal that complies with the analog RGB standard, which is output to the RGB socket 13.

If the RGB plug 101 is not connected to the RGB socket 13 and hence an HPL_RGB signal at the low level "0" is input to the first multiplexer 56 and if the HDMI plug 103 is connected to the HDMI socket 14 and hence an HPL_HDMI signal at the high level "1" is input to the second multiplexer 57, a video signal received from the GPU 31 is supplied to the HDMI converter 52 irrespective of the connection status of the DP socket 15 and converted into a video signal that complies with the HDMI standard, which is output to the HDMI socket 14.

For example, consideration will be given to a case that the RGB plug 101 is connected to the RGB socket 13. In this case, since an HPL_RGB signal at the high level "1" is generated, the first multiplexer 56 connects the signal lines 40 to the RGB converter 51 irrespective of connection statuses of the other sockets 14 and 15. As a result, whereas the signal lines 40 are electrically connected to the RGB converter 51 the signal lines 40 are disconnected from the other sockets 14 and 15.

The RGB socket 13 is electrically connected to the GPU 31 of the notebook PC 20 via the RGB converter 51 and the first multiplexer 56. Therefore, the HPL_RGB signal that is generated by the RGB converter 51 on the basis of a connection recognition signal that is output from the RGB socket 13 is supplied to the GPU 31.

When receiving the HPL_RGB signal, the GPU 31 receives information to the effect that the external display device 102 which is connected to the RGB socket 13 is a display device that is compatible with the analog RGB standard, in the form of data having, for example, the EDID (extended display identification data) format from the external display device 102 via the DDC signal lines. Then, the GPU 31 outputs a video signal that complies with the DP standard to the signal lines 30 which comply with the DP standard. The video signal is supplied to the RGB converter 51 and converted into a video signal that complies with the analog RGB standard, which is output to the analog-RGB-compatible external display device 102 via the RGB socket 13 and the RGB plug 101.

Consideration will be given to another case that the HDMI plug 103 is connected to the HDMI socket 14 and no plugs are connected to the other sockets 13 and 15. In this case, an HPL_RGB signal of "0" and an HPL_HDMI signal of "1" are generated. Therefore, the first multiplexer 56 connects the signal lines 40 to the second multiplexer 57 and the second multiplexer 57 connects the first multiplexer 56 to the HDMI converter 52.

The HDMI socket 14 is electrically connected to the GPU 31 of the notebook PC 20 via the HDMI converter 52, the second multiplexer 57, and the first multiplexer 56. Therefore, the HPL_HDMI signal that is output from the HDMI socket 14 is supplied to the GPU 31. When receiving the HPL_RGB signal, the GPU 31 receives information to the effect that the external display device 104 which is connected to the HDMI socket 14 is a display device that is compatible with the HDMI standard, in the form of data having, for example, the EDID format from the external display device 104 via the DDC signal lines.

Then, the GPU 31 outputs a video signal that complies with the logical layer standard of the HDMI standard to the signal lines 30 which comply with the DP standard. The video signal is supplied to the HDMI converter 52 and converted, through bias voltage (physical layer information) adjustment, into a video signal that complies with the physical layer standard of the HDMI standard, which is output to the HDMI-compatible external display device 104 via the HDMI socket 14 and the HDMI plug 103.

For still another example, consideration will be given to a case that the DP plug 105 is connected to the DP socket 15 and no plugs are connected to the other sockets 13 and 14. In this case, an HPL_RGB signal of "0" and an HPL_HDMI signal of "0" are generated. Therefore, the first multiplexer 56 connects the signal lines 40 to the second multiplexer 57 and the second multiplexer 57 connects the first multiplexer 56 to the DP converter 53.

The DP socket 15 is electrically connected to the GPU 31 of the notebook PC 20 via the DP converter 53, the second multiplexer 57, and the first multiplexer 56. Therefore, an HPL_DP signal that is output from the DPI socket 15 is supplied to the GPU 31. When receiving the HPL_DP signal, the GPU 31 receives information to the effect that the external display device 106 which is connected to the DP socket 15 is a display device that is compatible with the DP standard, in the form of data having, for example, the EDID format from the external display device 106 via the DDC signal lines.

Then, the GPU 31 outputs a video signal that complies with the DP standard to the signal lines 30 which comply with the DP standard. The video signal is supplied to the DP converter 53, supplied to the DP socket 15 as it is, and output to the DP-compatible external display device 106 via the DP socket 15 and the DP plug 105.

(1-2-2) Case that Higher Priority is Given to Connection to DP Socket 15 than to Connection to HDMI Socket 14

Another configuration is possible which is different from the configuration of FIG. 2 in that as shown in FIG. 3B an HPL_DP signal is input to the second multiplexer 57 as a switching control signal instead of an HPL_HDMI signal. In this configuration, a highest priority is given to connection to the RGB socket 13 and a higher priority is given to connection to the DP socket 15 than to connection to the HDMI socket 14.

Where the signal converter 50 outputs a video signal to a selected one of the sockets 13-15, an arbitrary priority order can be set by properly setting a manner of connections between the switching module 55 and the converters 51-53 and determining switching control signals to be input to the switching module 55.

(1-3) Operations in a Case that Highest Priority is Given to Connection to HDMI Socket 14

Next, to verify that priority order can be set arbitrarily, another example of priority order in which a highest priority is given to connection to the HDMI socket 14 will be described briefly.

Figure 4:
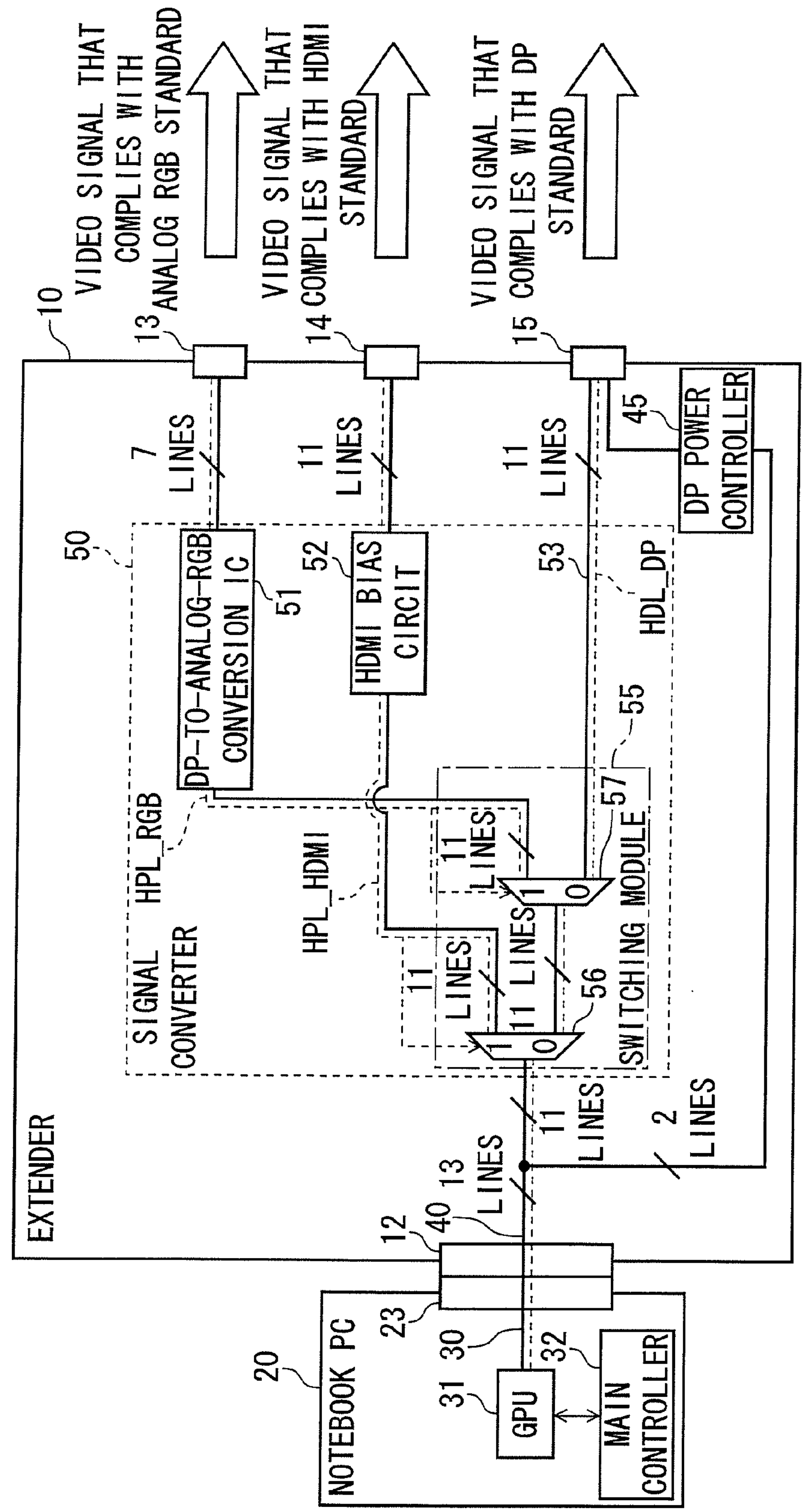
FIG. 4 is a block diagram showing a modified signal converter in a case that a highest priority is given to connection to the HDMI socket.

FIG. 4 is a block diagram showing a modified signal converter 50 in a case that a highest priority is given to connection to the HDMI socket 14. FIGS. 5A and 5B show example operations of the signal converter 50 in a case that a highest priority is given to connection to the HDMI socket 14. More specifically, FIG. 5A shows an example operation of the signal converter 50 in a case that a higher priority is given to connection, made by the extender 10 shown in FIG. 4, to the RGB socket 13 than to connection to the DP socket 15. FIG. 5B shows an example operation of the signal converter 50 in a case that a higher priority is given to connection to the DP socket 15 than to connection to the RGB socket 13.

(1-3-1) Case that Higher Priority is Given to Connection to RGB Socket 13 than to Connection to DP Socket 15

As shown in FIGS. 4 and 5A, in the configuration of FIG. 4, a highest priority is given to connection to the HDMI socket 14 and a higher priority is given to connection to the RGB socket 13 than to connection to the DP socket 15. More specifically, if the HDMI plug 103 is connected to the HDMI socket 14 and hence an HPL_RGB signal at the high level "1" is input to the first multiplexer 56, a video signal received from the GPU 31 is supplied to the HDMI converter 52 irrespective of connection statuses of the other sockets 13 and 15 and converted into a video signal that complies with the HDMI standard, which is output to the HDMI socket 14.

(1-3-2) Case that Higher Priority is Given to Connection to DP Socket 15 than to Connection to RGB Socket 13

Another configuration is possible which is different from the configuration of FIG. 4 in that as shown in FIG. 5B an HPL_DP signal is input to the second multiplexer 57 as a switching control signal instead of an HPL_RGB signal. In this configuration, a highest priority is given to connection to the HDMI socket 14 and a higher priority is given to connection to the DP socket 15 than to connection to the RGB socket 13.

Any other arbitrary priority order such as one in which highest priority is given to connection to the DP socket 15 can be set easily.

The extender 10 according to the embodiment has the video output terminals (sockets) 13-15 which comply with the three different video standards, (analog RGB standard, HDMI standard, and DP standard) and outputs a video signal to a selected one of the sockets 13-15. And the extender 10 receives a video signal from the notebook PC 20 via the signal lines 30 and the signal lines 40 the number of which complies with the prescribed video standard (DP standard).

Therefore, the extender 10 according to the embodiment can output video signals that comply with the plural respective video standards while reducing the number of pins of the extender-side connection terminal 12. Therefore, not only the extender-side connection terminal 12 but also the connection terminal 23 of the notebook PC 20 can be miniaturized. The extender 10 thus makes it possible to miniaturize an electronic apparatus to be connected to it.

The extender 10 according to the embodiment can automatically output, to a selected one of the plural video output terminals, a video signal that complies with the video standard corresponding to the selected video output terminal according to a preset priority order and connection statuses of the respective video output terminals.

The extender 10 according to the embodiment uses a DP-to-analog-RGB conversion IC as the conversion-to-RGB section 51. Therefore, even where an electronic apparatus connected to the extender 10 does not have a function of outputting a video signal that complies with the analog RGB standard, if the electronic apparatus can output a video signal that complies with the DP standard, the extender 10 can output a video signal that complies with the analog RGB standard through conversion of the video signal that complies with the DP standard. Therefore, where, for example, a user has an electronic apparatus that cannot output a video signal that complies with the analog RGB standard and an analog-RGB-compatible external display device (102), the extender 10 can mediate between the electronic apparatus and the analog-RGB-compatible external display device (102).

In a configuration in which the GPU 31 outputs a video signal that complies with the analog RGB standard (or HDMI standard) and the signal lines 30 and the signal lines 40 are signal lines that comply with the analog RGB standard (or HDMI standard), the converters 51-53 of the signal converter 50 may be configured so as to convert a received video signal into video signals that comply with the output destination sockets 13-15, respectively.

Another configuration is possible in which the switching module 55 is omitted and a video signal that is output from the GPU 31 is supplied equally to all the converters 51-53. In this case, a video signal that is output from the GPU 31 is converted by the converters 51-53 and resulting video signals are output to the sockets 13-15, respectively. Since a video signal has a high frequency, if the switching module 55 is omitted, it is preferable to take a proper measure to secure the quality of a high-frequency signal. For example, this may be done by minimizing the total length of the signal lines relating to the embodiment that are provided in the extender 10 and thereby preventing interference with other signal lines.

(2) Second Embodiment

Figure 6:
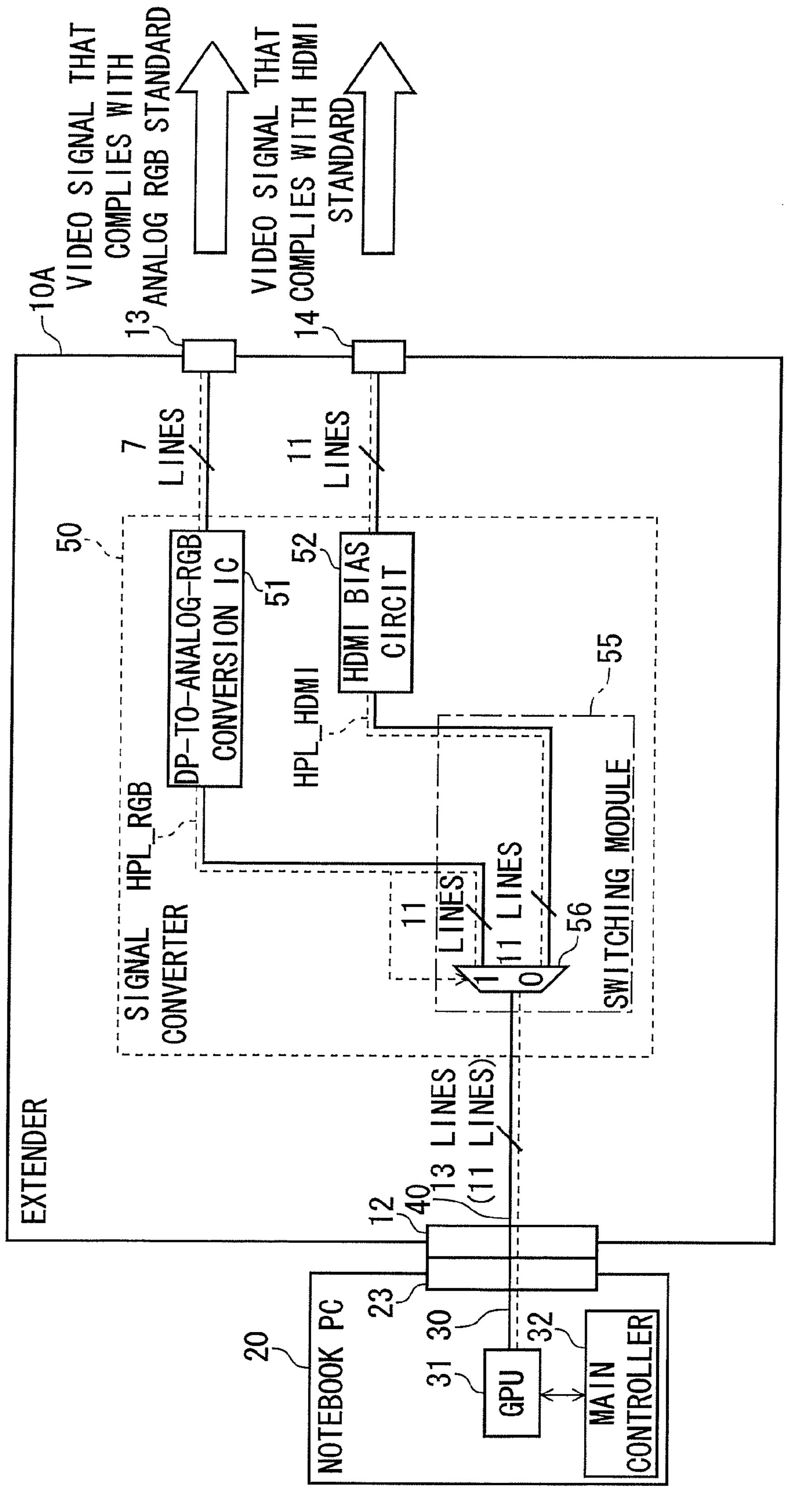
FIG. 6 is a block diagram outlining example internal configurations of an extender according to a second embodiment and a notebook PC.

FIG. 6 is a block diagram outlining example internal configurations of an extender 10A according to a second embodiment and a notebook PC 20.

The extender 10A according to the second embodiment is different from the extender 10 according to the first embodiment in that the former is not equipped with the DP socket 15, the DP power controller 45, the DP converter 53, and the second multiplexer 57. Since the other part of the configuration and related workings are substantially the same as in the extender 10 according to the first embodiment, members, sections, etc. having the same ones in the extender 10 according to the first embodiment are given the same reference symbols as the latter and will not be described in detail.

In the configuration of FIG. 6 in which the RGB converter 51 is connected to the "1"-side output terminal of the multiplexer 56 and an HPL_RGB signal is input to the multiplexer 56 as a switching control signal, a higher priority is given to connection to the RGB socket 13 than to connection to the HDMI socket 14. In another configuration in which the HDMI converter 52 is connected to the "1"-side output terminal of the multiplexer 56 and an HPL_HDMI signal is input to the multiplexer 56 as a switching control signal, a higher priority is given to connection to the HDMI socket 14 than to connection to the RGB socket 13.

Since the extender 10A according to the second embodiment is not equipped with the DP socket 15, the DP power controller 45 for supplying power to the DP socket 15 is not necessary. Therefore, among the signal lines 30 (13 lines in total) and the signal lines 40 (13 lines in total) of the extender 10 according to the first embodiment, the two signal lines for power control are not necessary.

The extender 10A according to the second embodiment can output video signals that comply with the plural respective video standards while reducing the number of pins of the extender-side connection terminal 12. The extender 10A according to the second embodiment can automatically output, to a selected one of the plural video output terminals, a video signal that complies with the video standard corresponding to the selected video output terminal according to a preset priority order and connection statuses of the respective video output terminals. Furthermore, where, for example, a user has an electronic apparatus that cannot output a video signal that complies with the analog RGB standard and an analog-RGB-compatible external display device (102), the extender 10A can mediate between the electronic apparatus and the analog-RGB-compatible external display device (102). The electronic apparatus and the analog-RGB-compatible external display device (102) can thus be used effectively instead of being rendered useless.

(3) Third Embodiment

Figure 7:
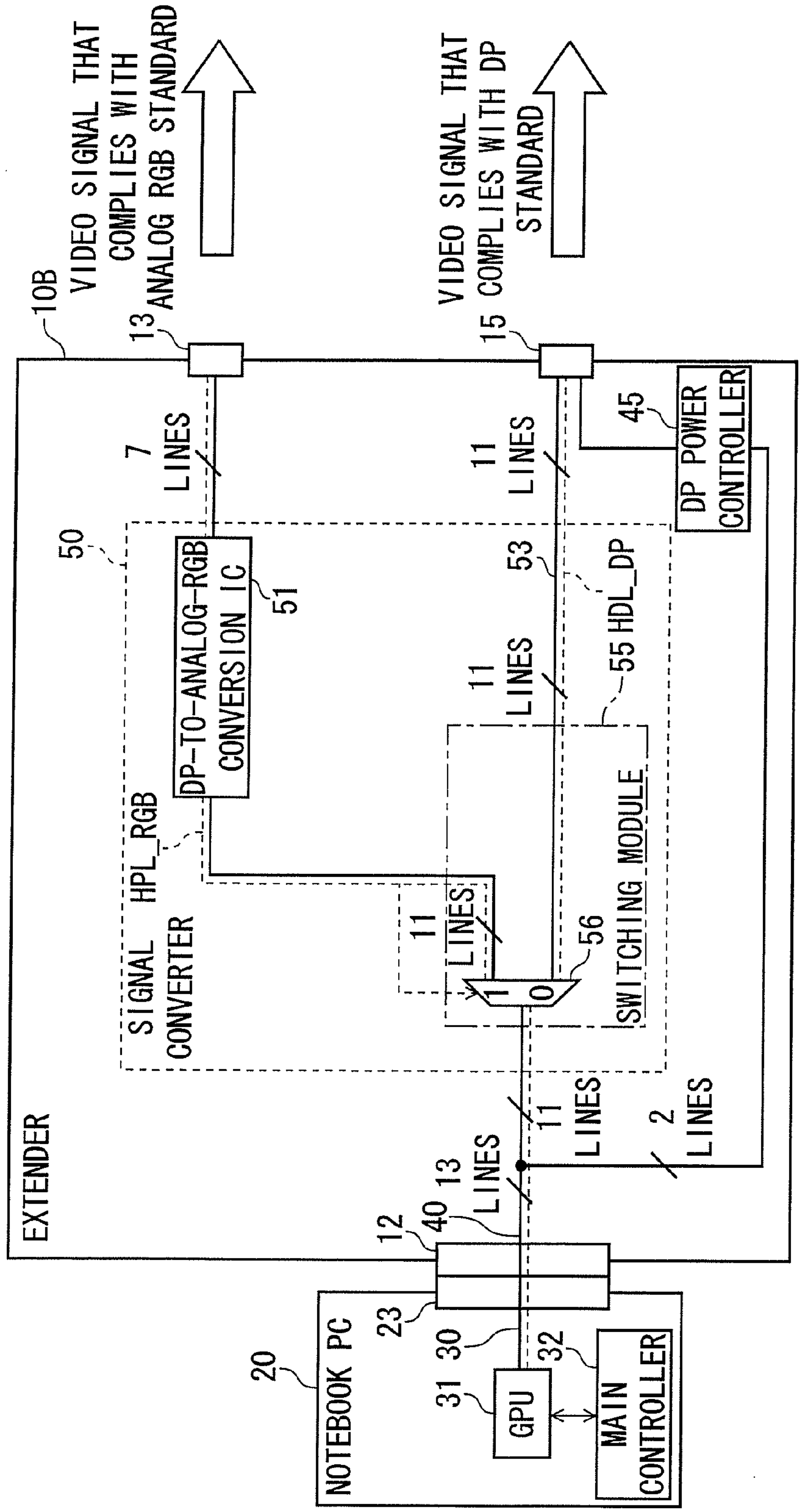
FIG. 7 is a block diagram outlining example internal configurations of an extender according to a third embodiment and a notebook PC.

FIG. 7 is a block diagram outlining example internal configurations of an extender 10B according to a third embodiment and a notebook PC 20.

The extender 10B according to the third embodiment is different from the extender 10 according to the first embodiment in that the former is not equipped with the HDMI socket 14, the HDMI converter 52, and the second multiplexer 57. Since the other part of the configuration and related workings are substantially the same as in the extender 10 according to the first embodiment, members, sections, etc. having the same ones in the extender 10 according to the first embodiment are given the same reference symbols as the latter and will not be described in detail.

In the configuration of FIG. 7 in which the RGB converter 51 is connected to the "1"-side output terminal of the multiplexer 56 and an HPL_RGB signal is input to the multiplexer 56 as a switching control signal, a higher priority is given to connection to the RGB socket 13 than to connection to the DP socket 15. In another configuration in which the DP converter 53 is connected to the "1"-side output terminal of the multiplexer 56 and an HPL_DP signal is input to the multiplexer 56 as a switching control signal, a higher priority is given to connection to the DP socket 15 than to connection to the RGB socket 13.

The extender 10B according to the third embodiment can output video signals that comply with the plural respective video standards while reducing the number of pins of the extender-side connection terminal 12. The extender 10B according to the third embodiment can automatically output, to a selected one of the plural video output terminals, a video signal that complies with the video standard corresponding to the selected video output terminal according to a preset priority order and connection statuses of the respective video output terminals. Furthermore, where, for example, a user has an electronic apparatus that cannot output a video signal that complies with the analog RGB standard and an analog-RGB-compatible external display device (102), the extender 10B can mediate between the electronic apparatus and the analog-RGB-compatible external display device (102). The electronic apparatus and the analog-RGB-compatible external display device (102) can thus be used effectively instead of being rendered useless.

(4) Fourth Embodiment

Figure 8:
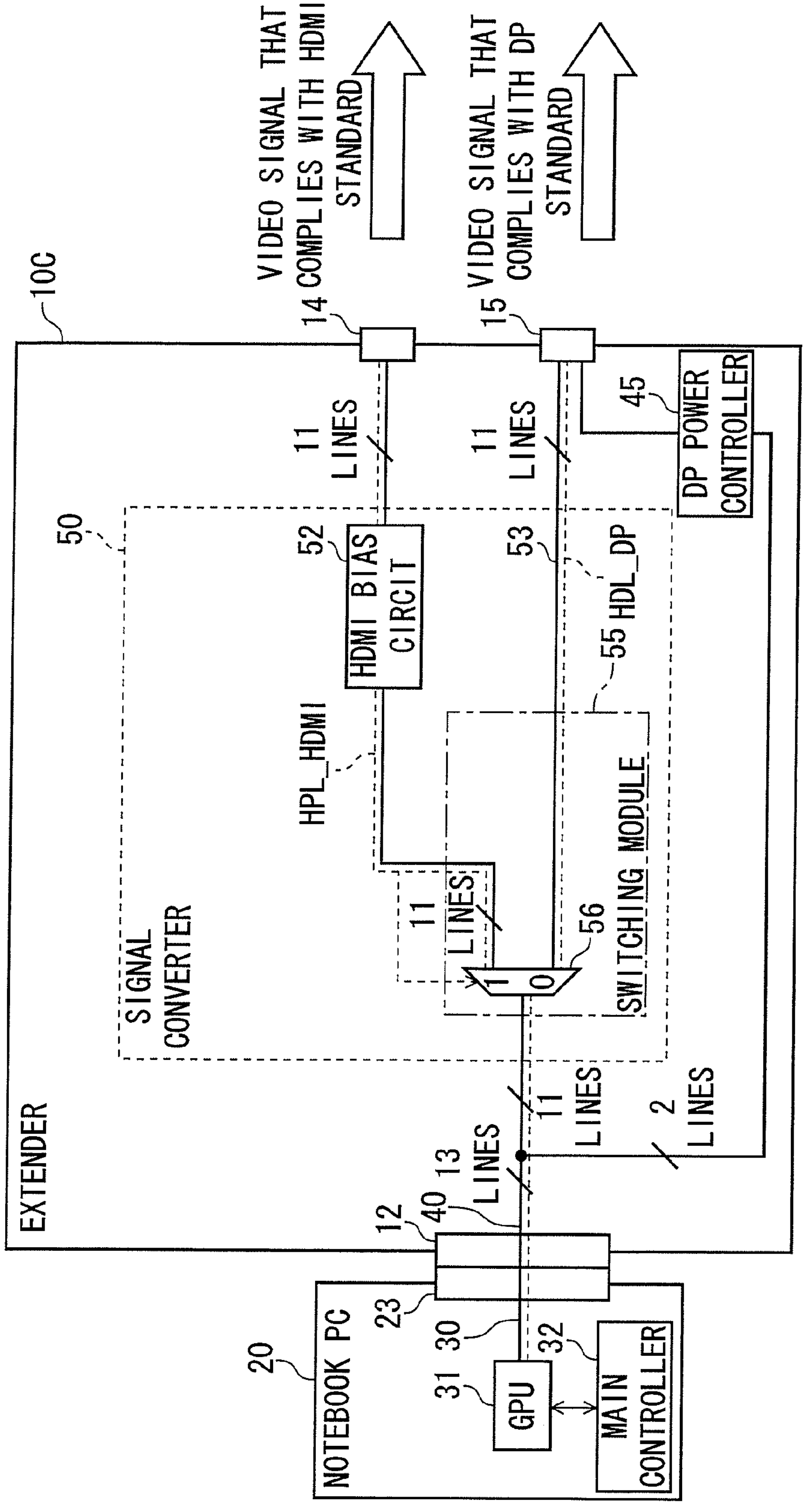
FIG. 8 is a block diagram outlining example internal configurations of an extender according to a third embodiment and a notebook PC.

FIG. 8 is a block diagram outlining example internal configurations of an extender 10C according to a fourth embodiment and a notebook PC 20.

The extender 10C according to the fourth embodiment is different from the extender 10 according to the first embodiment in that the former is not equipped with the RGB socket 13, the RGB converter 51, and the second multiplexer 57. Since the other part of the configuration and related workings are substantially the same as in the extender 10 according to the first embodiment, members, sections, etc. having the same ones in the extender 10 according to the first embodiment are given the same reference symbols as the latter and will not be described in detail.

In the configuration of FIG. 8 in which the HDMI converter 52 is connected to the "1"-side output terminal of the multiplexer 56 and an HPL_HDMI signal is input to the multiplexer 56 as a switching control signal, a higher priority is given to connection to the HDMI socket 14 than to connection to the DP socket 15. In another configuration in which the DP converter 53 is connected to the "1"-side output terminal of the multiplexer 56 and an HPL_DP signal is input to the multiplexer 56 as a switching control signal, a higher priority is given to connection to the DP socket 15 than to connection to the HDMI socket 14.

The extender 10C according to the fourth embodiment can output video signals that comply with the plural respective video standards while reducing the number of pins of the extender-side connection terminal 12. Furthermore, the extender 10C according to the fourth embodiment can automatically output, to a selected one of the plural video output terminals, a video signal that complies with the video standard corresponding to the selected video output terminal according to a preset priority order and connection statuses of the respective video output terminals.

As in the extender 10 according to the first embodiment, each of the extender 10A-10C according to the second to fourth embodiments may be modified in such a manner that the switching module 55 is omitted and a video signal that is output from the GPU 31 is supplied equally to all the converters.

(5) Fifth Embodiment

Figure 9:
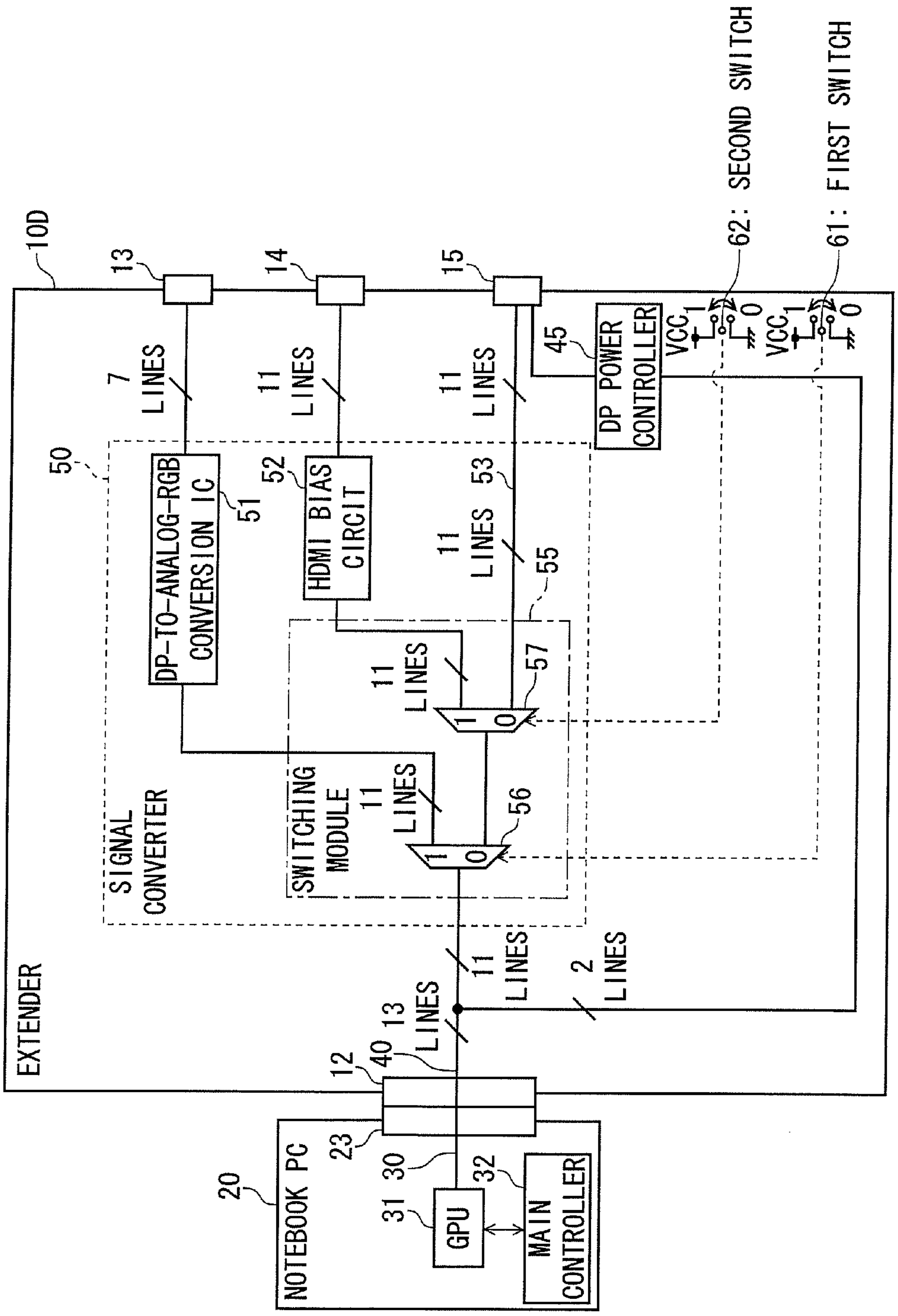
FIG. 9 is a block diagram outlining example internal configurations of an extender according to a fifth embodiment and a notebook PC.

FIG. 9 is a block diagram outlining example internal configurations of an extender 10D according to a fifth embodiment and a notebook PC 20.

The extender 10D according to the fifth embodiment is different from the extender 10 according to the first embodiment in that the former is equipped with a first switch 61 for outputting a switching control signal to the first multiplexer 56 and a second switch 62 for outputting a switching control signal to the second multiplexer 57. Since the other part of the configuration and related workings are substantially the same as in the extender 10 according to the first embodiment, members, sections, etc. having the same ones in the extender 10 according to the first embodiment are given the same reference symbols as the latter and will not be described in detail.

When manipulated by a user, the first switch 61 outputs a switching control signal to the first multiplexer 56. When manipulated by the user, the second switch 62 outputs a switching control signal to the second multiplexer 57.

FIG. 10 shows an example operation of the signal converter 50 in a case that a highest priority is given to connection to the RGB socket 13 made by the extender 10D of FIG. 9.

In the configuration of FIG. 9 in which one of the output terminals of the first multiplexer 56 is connected to the RGB converter 51, if the first switch 61 outputs a high-level switching control signal, a video signal that is output from the GPU 31 is supplied to the RGB converter 51 irrespective of the content of a switching control signal that is output from the second switch 62 and converted into a video signal that complies with the analog RGB standard, which is output to the RGB socket 13.

Therefore, in the configuration of FIG. 9, the first switch 61 functions as a switch for receiving an instruction as to whether to output a video signal to the RGB socket 13 (see FIG. 10). Therefore, for example, the first switch 61 may be such as to output, as a switching control signal, a signal equivalent to an HPL_RGB signal.

In the configuration of FIG. 9, the second switch 62 functions as a switch for receiving an instruction as to which of the HDMI socket 14 and the DP socket 15 a video signal should be output to in the case where the first switch 61 outputs a low-level switching control signal. It can be said that connection to the HDMI socket 14 and connection to the DP socket 15 are dealt with equivalently as long as the first switch 61 outputs a low-level switching control signal.

Naturally, the second switch 62 may be used as a switch for receiving an instruction as to whether to output a video signal to the HDMI socket 14 in the case where the first switch 61 outputs a low-level switching control signal. In this case, the second switch 62 may be such as to output, as a switching control signal, a signal equivalent to an HPL_HDMI signal.

The extender 10D according to the fifth embodiment can output video signals that comply with the plural respective video standards while reducing the number of pins of the extender-side connection terminal 12. The extender 10D according to the fifth embodiment can output, to a selected one of the plural video output terminals, a video signal that complies with the video standard corresponding to the selected video output terminal according to a preset priority order and a user manipulation(s) on the switches 61 and 62 which are provided in the extender 10D. Furthermore, where, for example, a user has an electronic apparatus that cannot output a video signal that complies with the analog RGB standard and an analog-RGB-compatible external display device (102), the extender 10D can mediate between the electronic apparatus and the analog-RGB-compatible external display device (102). The electronic apparatus and the analog-RGB-compatible external display device (102) can thus be used effectively instead of being rendered useless.

In connection with the extender 10D according to the fifth embodiment, as in the case of the extender 10 according to the first embodiment, an arbitrary priority order other than the above described one, such as one in which a highest priority is given to connection to the HDMI socket 14, can be set easily (refer to FIG. 4, for example). Where there are only two video output terminals as in the cases of the extender 10A-10C according to the second to fourth embodiments, it suffices that only one multiplexer and hence only one switch be provided.

Like the extender 10 according to the first embodiment, the extender 10D according to the fifth embodiment may be modified in such a manner that the switching module 55 is omitted and a video signal that is output from the GPU 31 is supplied equally to all the converters 51-53.

(6) Sixth Embodiment

Figure 11:
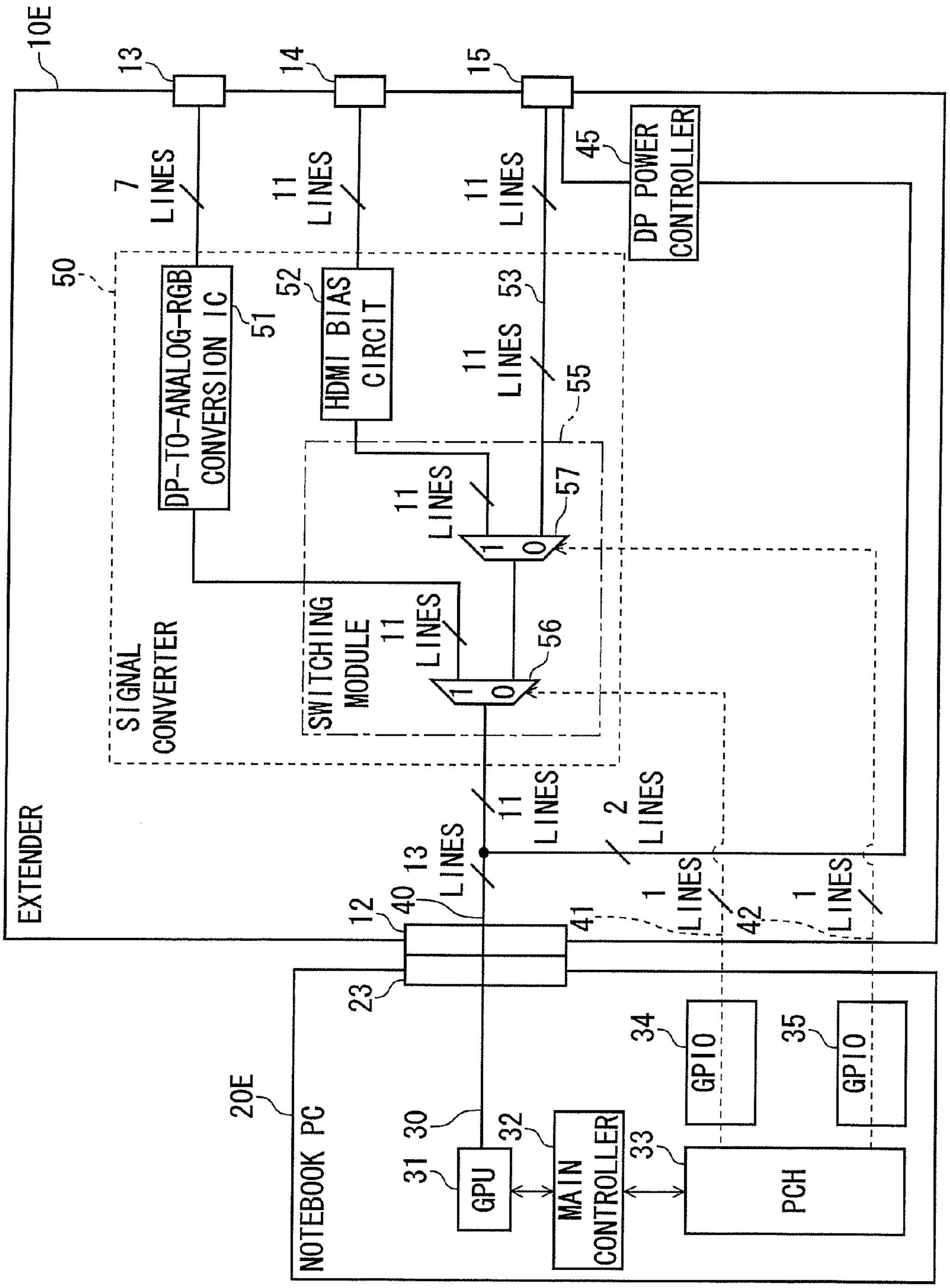
FIG. 11 is a block diagram outlining example internal configurations of an extender and a notebook PC according to a sixth embodiment.

FIG. 11 is a block diagram outlining example internal configurations of an extender 10E and a notebook PC 20E according to a sixth embodiment.

The extender 10E according to the sixth embodiment is different from the extender 10 according to the first embodiment in that the former has a single, first signal line 41 for supplying a switching control signal to the first multiplexer 56 from a notebook PC 20E and a single, second signal line 42 for supplying a switching control signal to the second multiplexer 57 from the notebook PC 20E and that switching control signals are supplied to the first multiplexer 56 and the second multiplexer 57 from the notebook PC 20E. Since the other part of the configuration and related workings are substantially the same as in the extender 10 according to the first embodiment, members, sections, etc. having the same ones in the extender 10 according to the first embodiment are given the same reference symbols as the latter and will not be described in detail.

The notebook PC 20E is further equipped with a PCH (platform controller hub) 33, a first GPIO (general-purpose input/output) 34, and a second GPIO.

The main controller 32 displays, on the display panel 27, a selection request image for causing a user to select one of the output destination sockets 13-15. The main controller 32 receives instruction information that is input by the user through the selection request image by manipulating a manipulation unit.

The PCH 33 is a chip in which I/O controller functions of various devices are integrated. In response to instruction information that is input by a user, the main controller 32 supplies a switching control signal to the first multiplexer 56 via the PCH 33 and the first GPIO 34 and supplies another switching control signal to the second multiplexer 57 via the PCH 33 and the second GPIO 35.

FIG. 12 shows an example operation of the signal converter 50 in a case that a highest priority is given to connection to the RGB socket 13 made by the extender 10E of FIG. 11.

In the configuration of FIG. 11 in which one of the output terminals of the first multiplexer 56 is connected to the RGB converter 51, if the first GPIO 34 outputs a high-level switching control signal, a video signal that is output from the GPU 31 is supplied to the RGB converter 51 irrespective of the content of a switching control signal that is output from the second GPIO 35 and converted into a video signal that complies with the analog RGB standard, which is output to the RGB socket 13.

Therefore, in the configuration of FIG. 11, the first GPIO 34 outputs a switching control signal indicating whether to output a video signal to the RGB socket 13 (see FIG. 12). Therefore, for example, the first GPIO 34 may output, as a switching control signal, a signal equivalent to an HPL_RGB signal.

In the configuration of FIG. 11, the second GPIO 35 outputs a switching control signal indicating which of the HDMI socket 14 and the DP socket 15 a video signal should be output to in the case where the first GPIO 34 outputs a low-level switching control signal. It can be said that connection to the HDMI socket 14 and connection to the DP socket 15 are dealt with equivalently as long as the first GPIO 34 outputs a low-level switching control signal.

Naturally, the second GPIO 35 may be regarded as a section for outputting a switching control signal indicating whether to output a video signal to the HDMI socket 14 in the case where the first GPIO 34 outputs a low-level switching control signal. In this case, the GPIO 35 may output, as a switching control signal, a signal equivalent to an HPL_HDMI signal.

The extender 10E according to the sixth embodiment can output video signals that comply with the plural respective video standards while reducing the number of pins of the extender-side connection terminal 12. The extender 10E according to the sixth embodiment can output, to a selected one of the plural video output terminals, a video signal that complies with the video standard corresponding to the selected video output terminal according to a preset priority order and a user manipulation(s) on a manipulation unit of the notebook PC 20E. Furthermore, where, for example, a user has an electronic apparatus that cannot output a video signal that complies with the analog RGB standard and an analog-RGB-compatible external display device (102), the extender 10E can mediate between the electronic apparatus and the analog-RGB-compatible external display device (102). The electronic apparatus and the analog-RGB-compatible external display device (102) can thus be used effectively instead of being rendered useless.

In connection with the extender 10E according to the sixth embodiment, as in the case of the extender 10 according to the first embodiment, an arbitrary priority order other than the above described one, such as one in which a highest priority is given to connection to the HDMI socket 14, can be set easily (refer to FIG. 4, for example). Where there are only two video output terminals as in the cases of the extender 10A-10C according to the second to fourth embodiments, it suffices that only one multiplexer and hence only one GPIO be provided.

Like the extender 10 according to the first embodiment, the extender 10E according to the sixth embodiment may be modified in such a manner that the switching module 55 is omitted and a video signal that is output from the GPU 31 is supplied equally to all the converters 51-53.

For example, when the extender 10 according to the first embodiment and the extender 10E according to the sixth embodiment are combined together, a final output destination socket can be determined taking into consideration both of settings that are input by a user by manipulating a manipulation unit of the notebook PC 20E and connection statuses of the sockets 13-15.

In this case, for example, a configuration is possible in which a first register is provided to show which of an output signal of the first GPIO 34 and an HPL_RGB signal should be given priority depending on their contents and whether the first multiplexer 56 should output a high-level switching control signal or a low-level switching control signal is determined according to a value of the first register and in which a second register is provided to show which of an output signal of the second GPIO 35 and an HPL_HDMI signal should be given priority depending on their contents and whether the second multiplexer 57 should output a high-level switching control signal or a low-level switching control signal is determined according to a value of the second register.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. An extender for extending functions of an electronic apparatus, comprising:

a connection terminal electrically connected to the electronic apparatus;

input signal lines connected to the connection terminal so as to transmit a video signal that is supplied from the electronic apparatus via the connection terminal, wherein the number of the input signal lines complies with a certain video signal standard;

a first video output terminal which complies with a first standard;

a second video output terminal which complies with a second standard; and a signal converter configured to convert the video signal that is supplied from the electronic apparatus into a first video signal that complies with the first standard so as to output the first video signal to the first video output terminal and configured to convert the video signal into a second video signal that complies with the second standard so as to output the second video signal to the second video output terminal, wherein the signal converter comprises:

a first converter configured to convert the video signal into the first video signal to output the first video signal to the first video output terminal;

a second converter configured to convert the video signal into the second video signal to output the second video signal to the second video output terminal; and a switching module configured to switch between: electrical connection between the input signal lines and the first converter; and electrical connection between the input signal lines and the second converter, wherein the first video output terminal is configured to output a first connection recognition signal that complies with the first standard when a first video input terminal that complies with the first standard is connected to the first video output terminal, and wherein the switching module is configured to connect the input signal lines to the first converter when the switching module receives the first connection recognition signal, and wherein the switching module is configure to connect the input signal lines to the second converter when the switching module does not receive the first connection recognition signal.

2. The extender of claim 1, wherein the certain video signal standard is one of the first standard and the second standard, wherein when the certain video signal standard is the first standard, the first converter is configured to output the video signal to the first video output terminal without converting the video signal, and wherein when the certain video signal standard is the second standard, the second converter is configured to output the video signal to the second video output terminal without converting the video signal.

3. The extender of claim 2, further comprising:

a third video output terminal which complies with a third standard, and wherein the signal converter further comprises:

a third converter configured to convert the video signal into a third video signal to output the third video signal to the third video output terminal, wherein the second video output terminal is configured to output a second connection recognition signal that complies with the second standard when a video input terminal that complies with the second standard is connected to the second video output terminal, and wherein the switching module is configured to connect the input signal lines to the first converter when the switching module receives the first connection recognition signal, wherein the switching module is configured to connect the input signal lines to the second converter when the switching module does not receive the first connection recognition signal but receives the second connection recognition signal, and wherein the switching module is configured to connect the input signal lines to the third converter when the switching module receives neither the first connection recognition signal nor the second connection recognition signal.

4. The extender of claim 3, wherein the certain video signal standard is one of the first standard, the second standard, and the third standard, and wherein when the certain video signal standard is the first standard, the first converter is configured to output the video signal to the first video output terminal without converting the video signal, wherein when the certain video signal standard is the second standard, the second converter is configured to output the video signal to the second video output terminal without converting the video signal, and wherein when the certain video signal standard is the third standard, the third converter is configured to output the video signal to the third video output terminal without converting the video signal.

5. The extender of claim 4, wherein the first standard, the second standard, and the third standard are different from each other and are each a standard selected from the group consisting of an analog RGB standard, an HDMI standard, and a DisplayPort standard.

6. The extender of claim 5, wherein the first standard is the analog RGB standard, the second standard is the HDMI standard, and the certain video signal standard and the third standard are the DisplayPort standard, and wherein the number of the input signal lines complies with the DisplayPort standard.

7. The extender of claim 6, wherein the first connection recognition signal and the second connection recognition signal are provided to the switching module and supplied to the electronic apparatus via the signal converter and the connection terminal, wherein the electronic apparatus outputs a video signal that complies with a logical layer standard of the DisplayPort standard, when the electronic apparatus receives the first connection recognition signal or receives neither the first connection recognition signal nor the second connection recognition signal, wherein the electronic apparatus outputs a video signal that complies with a logical layer standard of the HDMI standard, when the electronic device does not receive the first connection recognition signal but receives the second connection recognition signal, wherein the first converter is configured to convert the video signal into a video signal that complies with the analog RGB standard so as to output the video signal to the first video output terminal, wherein the second converter is configured to convert the video signal into a video signal that complies with a physical layer standard of the HDMI standard by adjusting a bias voltage of the video signal so as to output the video signal to the second video output terminal, and wherein the third converter is configured to output the video signal to the third video output terminal without converting the video signal.

8. The extender of claim 3, further comprising:

a first signal line connected to the connection terminal to transmit a first switching control signal corresponding to the first connection recognition signal, from the electronic apparatus to the switching module; and a second signal line connected to the connection terminal to transmit a second switching control signal corresponding to the second connection recognition signal, from the electronic apparatus to the switching module, and wherein the electronic apparatus controls supply of the first switching control signal and the second switching control signal via the connection terminal in response to user settings.

9. The extender of claim 3, further comprising:

a first switch configured to output a first switching control signal corresponding to the first connection recognition signal to the switching module in response to a user operation; and a second switch configured to output a second switching control signal corresponding to the second connection recognition signal to the switching module in response to a user operation.

10. The extender of claim 1, further comprising:

first signal lines connecting the first video output terminal and the first converter, wherein the first signal lines comply with the first standard; and second signal lines connecting the second video output terminal and the second converter, wherein the second signal lines comply with the second standard, wherein the certain video signal standard is one of the first standard and the second standard, and wherein the number of the input signal lines is smaller than the sum of the number of the first signal lines and the number of the second signal lines.

* * * * *